Patented Feb. 13, 1934

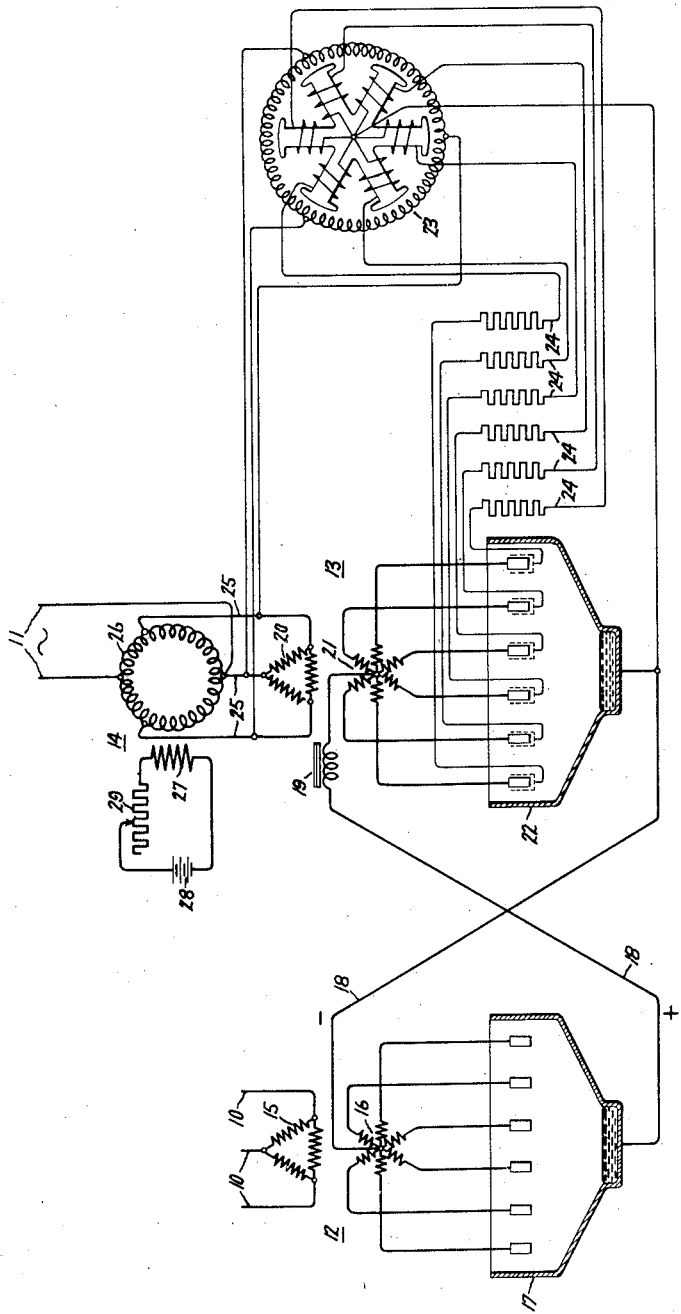

1,947,233

UNITED STATES PATENT OFFICE 1,947,233

ELECTRICAL DISTRIBUTION

Max Stöhr, Berlin-Spandau, Germany, assignor to General Electric Company, a corporation of New York Application May 28, 1932, Serial No. 614,203, and in Germany July 22, 1931

3 Claims. (Cl. 172—281)

My invention relates to systems of electrical distribution and more particularly to such systems adapted to transmit energy between a substantially steady power circuit and a single phase alternating current circuit. While my invention is of general application, it is particularly useful in connection with the transmission of power between single phase and polyphase alternating current circuits by means of electric valve frequency changers.

Heretofore, there have been proposed numerous arrangements for transmitting energy between direct and alternating current circuits or between independent alternating current circuits of the same or different frequencies. The use of electric valve converting apparatus for this purpose is particularly advantageous since, by means of such apparatus, the magnitude and direction of the transmission of power between the two circuits may be readily controlled. When transmitting energy between single phase and direct current or polyphase alternating current circuits, however, some difficulty has been experienced due to the fact that power delivered by or consumed by a single phase alternating current circuit is inherently pulsating in its nature, while for optimum operating conditions on a direct current or polyphase circuit it is essential that the flow of power be substantially steady. When energy is exchanged between two alternating current systems by means of rotating dynamo-electric machines, the inertia of the rotating masses is effective to absorb and release the momentary differences between the pulsating power of the single phase system and the steady power of the polyphase system. In the use of electric valve frequency changers, however, and other similar static equipments, the system is substantially inertialess; that is, there is no energy storage element for absorbing and releasing these momentary differences in power. One arrangement utilizing an electric valve frequency changer which overcomes the above mentioned disadvantages of the arrangements of the prior art, is disclosed in a copending application of Hans Laub, Serial No. 614,207, filed May 28, 1932, and assigned to the same assignee as the present application, which broadly claims the use of an auxiliary dynamo-electric machine in such an arrangement to absorb and release the momentary differences in power between the two circuits.

It is an object of my invention, therefore, to provide an improved system of electrical distribution which will overcome the above mentioned disadvantages of the arrangements of the prior art and which will be simple and reliable in operation.

It is another object of my invention to provide an improved system of electrical distribution including an electric valve converting apparatus for transmitting energy between a substantially steady power circuit and a single phase alternating current circuit in which there is provided means for absorbing and releasing the momentary differences in power between the two circuits.

In accordance with one embodiment of my invention a substantially steady power circuit, such for example, as a polyphase alternating current circuit or a direct current circuit which may, if desired, be derived from a polyphase alternating current circuit, is connected to supply energy to a variable frequency single phase alternating current circuit through an electric valve converting apparatus. Interposed between the electric valve converting apparatus, which is connected to supply polyphase alternating current, and the single phase alternating current circuit, is a synchronous phase converter provided with a polyphase armature winding having three symmetrically spaced terminals for connection to the polyphase output circuit of the valve converting apparatus, and a pair of diametrically spaced terminals for connection to the single phase alternating current circuit. The synchronous phase converter interposed in the system is preferably provided with considerable inertia and serves to absorb and release the momentary differences between the pulsating power characteristic of the single phase system, and the substantially steady power which it is desired to maintain on the supply circuit. The rating of the synchronous phase converter may be only a fraction of that of the other apparatus since it carries only the differences in power between the single phase and polyphase alternating current circuits.

For a better understanding of my invention, together with other and further objects thereof, reference is had to the following description taken in connection with the accompanying drawing and its scope will be pointed out in the appended claims. The single figure of the accompanying drawing illustrates my invention as applied to a system for transmitting energy from a three phase alternating current supply circuit to a single phase alternating current load circuit of either constant or variable frequency.

Referring now to the drawing, I have illustrated a system of distribution embodying my invention for transmitting energy from a polyphase alternating current supply circuit 10 to a single phase alternating current circuit 11 which may be of any desired constant or variable frequency. This system includes an electric valve frequency changer illustrated as comprising a polyphase rectifier 12, a polyphase inverter 13 and a synchronous phase converter 14 interconnecting the output circuit of the inverter with the single phase alternating current circuit 11. The rectifier 12 comprises a transformer having a polyphase winding 15 connected to the supply circuit 10 and a polyphase secondary winding 16, the several terminals of which are connected to the anodes of a multiple anode mercury arc discharge device 17, the direct current output circuit 18 of the rectifier being connected to the cathode of the device 17 and the electrical neutral of the secondary winding 16 in a well known manner. A reactance device 10 is preferably included in the direct current circuit 18 to assist in maintaining steady the power transmitted through the apparatus. The electric valve inverter 13 comprises a transformer having a polyphase secondary winding 20 and a polyphase primary winding 21, the several terminals of which are connected to the anodes of a multiple anode mercury arc discharge device 22, the direct current supply circuit 18 being connected to the electrical neutral of the winding 21 and the cathode of the device 22 in a well known manner.

In order to control the transfer of current between the several phases of the winding 21, each of the anodes of the device 22 is provided with an associated control grid and this grid is excited with a potential of a phase relation corresponding to that of the phase winding connected to its associated anode. For example, if the alternating current circuit 11 is connected to an independent source of electromotive force for determining its frequency and phase relation, the several grids of the device 22 may be energized directly from the output transformer winding 20 through a rotary phase shifting transformer 23 and current limiting resistors 24. In case the circuit 11 is not connected to an independent source of electromotive force, the rotary phase shifting transformer 23 may be energized from any source of electromotive force of the frequency which it is desired to supply to the circuit 11, or the several grids may be excited by any well known commutator arrangement. The transformer secondary winding 20 is connected to an intermediate polyphase circuit 25 from which is energized the armature winding 26 of the synchronous phase converter 14. The converter 14 is provided with a rotatable exciting winding 27 which may be energized from any suitable source of direct current 28 through a variable resistor 29.

The general principles of operation of the valve converting apparatus described above will be well understood by those skilled in the art. In brief, the rectifying apparatus 12 serves to convert the polyphase alternating current supplied by the circuit 10 into unidirectional current from which the circuit 18 is energized, and the inverting apparatus 13 reconverts the unidirectional current supplied by the circuit 18 into polyphase alternating current of a frequency dependent upon the excitation of the grids of the device 22, that is, upon the frequency of the single phase alternating current circuit 11. The rotary phase shifting transformer 23 is so adjusted that the potentials applied to the grids of the several electric valves lead their associated anode potentials by a small commutating angle so that the current may be transferred from one phase of the winding 21 to the succeeding phase at a point in the cycle when the counter-electromotive force of the incoming phase is less than that of the preceding phase. In this way the counter-electromotive force of the winding 21 is effective to commutate the current between the several anodes of the discharge device 22. The armature winding 26 of the phase converter 14 is energized from the secondary winding 20 and will draw a load through the electric valve converting apparatus depending upon the mechanical phase relation of the rotor 27 with respect to the rotating magnetic field of the armature winding 26. The converter 14 acts as a combined motor and generator with common field and armature windings; that is, the armature winding 26 together with the field winding 27 and the single phase terminals of the winding 26 constitute a single phase synchronous generator so that the position of the rotor 27 depends upon the single phase electrical load drawn from the armature winding 26. Obviously, the momentary differences in power between the substantially steady power of the polyphase circuit and the pulsating power of the single phase circuit are absorbed and released from the kinetic energy of the rotating field member 27. In this manner, substantially steady power may be drawn from the polyphase alternating current circuit 10 and supplied in the form of pulsating power to the single phase alternating current circuit 11, operating at any desired constant or variable frequency.

While I have described what I at present consider the preferred embodiment of my invention, it will be obvious to those skilled in the art that various changes and modifications may be made without departing from my invention, and I, therefore, aim in the appended claims to cover all such changes and modifications as fall within the true spirit and scope of my invention.

What I claim as new and desire to secure by Letters Patent of the United States is:

1. A system of electrical distribution comprising a substantially steady power circuit, a single phase alternating current circuit, an intermediate polyphase alternating current circuit, an electric valve converting apparatus for transmitting energy between said steady power circuit and said polyphase circuit, and energy storage means interconnecting said polyphase and single phase circuits for absorbing and releasing instantaneous differences between the steady power of said power circuit and the pulsating power of said single phase system.

2. A system of electrical distribution comprising a substantially steady power circuit, a variable frequency single phase alternating current circuit, an intermediate polyphase alternating current circuit, an electric valve converting apparatus for transmitting energy between said steady power circuit and said polyphase circuit, and a rotary phase converter interconnecting said polyphase and single phase circuits for absorbing and releasing instantaneous differences between the steady power of said power circuit and the pulsating power of said single phase system.

3. A system of electrical distribution comprising a polyphase alternating current supply circuit, a variable frequency single phase alternating current load circuit, an intermediate polyphase alternating current circuit of the frequency of said single phase circuit, an electric valve converting apparatus for transmitting energy from said supply circuit to said intermediate circuit and a rotary phase converter interconnecting said intermediate and single phase circuits for absorbing and releasing instantaneous differences between the steady power of said supply circuit and the pulsating power of said single phase system.

MAX STÖHR.